US008270456B2

United States Patent
Leach et al.

(10) Patent No.: US 8,270,456 B2
(45) Date of Patent: Sep. 18, 2012

(54) DIGITAL RADIO SYSTEMS

(75) Inventors: Martin Leach, Cambridge (GB); Cyril Valadon, Letchworth (GB); Neil Colin Campbell, Cambridge (GB)

(73) Assignee: MStar Semiconductor, Inc., Grand Cayman (KY)

( * ) Notice: Subject to any disclaimer, the term of this patent is extended or adjusted under 35 U.S.C. 154(b) by 862 days.

(21) Appl. No.: 12/373,998

(22) PCT Filed: Jul. 26, 2007

(86) PCT No.: PCT/GB2007/002857
§ 371 (c)(1),
(2), (4) Date: Jan. 15, 2009

(87) PCT Pub. No.: WO2008/012553
PCT Pub. Date: Jan. 31, 2008

(65) Prior Publication Data
US 2010/0014614 A1    Jan. 21, 2010

(30) Foreign Application Priority Data

Jul. 28, 2006  (GB) .................................. 0615068.4

(51) Int. Cl.
*H04B 1/00* (2006.01)
(52) U.S. Cl. ....................................................... 375/148
(58) Field of Classification Search .................. 375/229, 375/230, 232, 148
See application file for complete search history.

(56) References Cited

U.S. PATENT DOCUMENTS

| | | | |
|---|---|---|---|
| 6,570,918 B1 * | 5/2003 | Rademacher | 375/232 |
| 6,775,260 B1 | 8/2004 | Dabak et al. | |
| 6,966,024 B2 | 11/2005 | Park | |
| 7,110,434 B2 | 9/2006 | Currivan et al. | |
| 7,149,258 B2 | 12/2006 | Nilsson et al. | |
| 2003/0227960 A1 * | 12/2003 | Papasakellariou | 375/147 |
| 2004/0028121 A1 * | 2/2004 | Fitton | 375/144 |
| 2004/0076224 A1 * | 4/2004 | Onggosanusi et al. | 375/144 |
| 2004/0128592 A1 * | 7/2004 | Park | 714/709 |
| 2004/0156422 A1 * | 8/2004 | Liljestrom | 375/148 |
| 2004/0161057 A1 * | 8/2004 | Malladi et al. | 375/340 |
| 2005/0129105 A1 * | 6/2005 | Papasakellariou | 375/232 |
| 2006/0133462 A1 * | 6/2006 | Nguyen et al. | 375/150 |
| 2007/0189231 A1 * | 8/2007 | Chang et al. | 370/335 |
| 2008/0130718 A1 * | 6/2008 | Catreux-Erceg et al. | 375/148 |
| 2008/0232439 A1 * | 9/2008 | Chen | 375/148 |

FOREIGN PATENT DOCUMENTS

| | | |
|---|---|---|
| EP | 1133072 A1 | 12/2001 |
| EP | 1191755 A2 | 3/2002 |
| EP | 1612983 A2 | 4/2006 |

OTHER PUBLICATIONS

Latva-Aho et al.,( "Reconfigurable Adaptive RAKE receiver for Wideband CDMA Systems," IEEE 48th Veh Cular Technology Conference, Vo. 3, May 18-21, 1998, XP010288219, pp. 1740-1744).*

(Continued)

*Primary Examiner* — Jaison Joseph
(74) *Attorney, Agent, or Firm* — Edell, Shapiro & Finnan, LLC

(57) ABSTRACT

Apparatus comprising a pre-filter rake architecture with various features designed to, in at least some circumstances, to lessen the data processing burden associated with the architecture. In one embodiment, the pre-filter aspect can be disabled.

4 Claims, 5 Drawing Sheets

OTHER PUBLICATIONS

Hooli, K. et al., "Chip-Level Channel Equalization in WCDMA Downlink," EURASIP Journal on Applied Signal Processing, XP-002997529, 2002:8, pp. 757-770.

WCDMA for UMTS, XP-002272463, Published Jan. 1, 2001, pp. 30-33.

Hooli, K. et al., "Performance Evaluation of Adaptive Chip-Level Channel Equalizers in WCDMA Downlink," IEEE 2001, pp. 1974-1979.

Messier, G. et al., "Performance of turbo Coding With Improved Interference Estimation on the CDMA Space time Transmit Diversity Forward Link," IEEE Transactions on Vehicular Technology, vol. 55, No. 3, May 2006, pp. 1074-1079.

* cited by examiner

DIGITAL RADIO SYSTEMS

BACKGROUND

In a typical radio system (see FIG. 1), information is modulated onto a radio carrier by a transmitter. This signal then travels via an unknown and changing environment to the receiver. The ability to remove the effects of the environment from the signal is often key to the performance of a receiver.

The transmitter 101 passes information bits through a block adding error protection coding 102 and then through a modulation block 103 which modulates the coded information onto a radio carrier. As part of the modulation, known symbols may be added to assist with radio channel estimation in the receiver.

Once transmitted, the radio signal then passes through the radio channel 104 before reception 108. This radio channel frequently gives rise to Inter-Symbol Interference (ISI) which must then be removed by the receiver to ensure correct reception. Before being processed by the receiver blocks, the signal also acquires both interference and noise. The interference arises from other users of the spectrum whilst the noise is thermal noise from the environment. Additional noise is then added as the signal passes through the Rx front end 105.

The receiver 108 converts the analogue radio signal to a digital base band signal in the Rx front-end 105. The signal is then passed through the demodulation block 106. This serves to estimate the transmitted coded-bits in the presence of the ISI, interference and noise added by the radio channel and the Rx front end. The signal is then decoded 107 to yield the final received information bits.

The quality of service experienced by the user as well as the overall capacity of the system depends largely on the selected implementation of the demodulation unit. For W-CDMA systems, it is typical to use a Rake architecture in the receiver (*CDMA—Principles of Spread Spectrum Communication*, Andrew J. Viterbi, *Addison-Wesley Wireless Communications Series*). The Rake receiver combines the contributions from the different paths in the propagation channel in order to generate samples to be processed by the channel decoder. The Rake receiver is therefore able to exploit the diversity provided by the propagation channel. However, the decisions generated by the Rake receiver suffer from an increase in noise level due to ISI.

High-Speed Downlink Packet Access (HSDPA) is an evolution of the Release 99 version of the 3GPP standard aimed at providing improved user experience through increased data rates and reduced end-to-end latency. These improvements are delivered through a combination of Incremental Redundancy (IR) and the use of higher-order modulation schemes. HSDPA extends the capabilities of 3GPP by introducing the use of the 16QAM modulation for the data bearing channels. The 16QAM modulation is more spectrally efficient than the QPSK modulation used in 3G. However, it is also more sensitive to impairments introduced in the transmission link. Hence, in order to fully exploit the benefits of the new features introduced in HSDPA, it is important to select an implementation of the demodulation unit which is resistant to noise and interference.

Recently, new receiver architectures have been introduced where the demodulation accuracy is improved at the expense of the implementation complexity. The Linear Minimum Mean Square Error (LMMSE) equaliser is an example of such an architecture (*Chip-Level Channel Equalization in WCDMA Downlink*, K Hooli, M Juntti, M. J. Heikkila, P. Komulainen, M Latva-aho, J. Lilleberg, *EURASIP Journal on Applied Signal Processing*, August 2002). The LMMSE equaliser improves the performance of the demodulation unit by mitigating the distortions introduced by the propagation channel. The LMMSE equaliser can be implemented using a pre-filter Rake architecture (*Equalization in WCDMA terminals*, Kari Hooli, PhD thesis, 2003) where the conventional Rake receiver is preceded by a linear filter which aims at removing the ISI introduced by the channel.

In most propagation environments, the link level performance of the linear equaliser will be significantly better than that of the more conventional Rake receiver. It should however be noted that this improvement in performance is achieved at the expense of the implementation complexity. This will have a negative impact on the die-size and power-consumption of the receiver.

One of the major sources of complexity in the implementation of the receiver comes from the large number of different operation modes that are required. The information intended for a user may be sent over more than one logical channel. In HSDPA for example, the information is sent over the combination of one control and one dedicated channel. The dedicated HS-DSCH channel contains the information intended for a specific user. The HS-SCCH control channel is used to carry information on the format of the HS-DSCH transmission. Hence, both the HS-SCCH control channel and the HS-DSCH dedicated channel need to be processed at the receiver in order to recover the transmitted information. The HS-SCCH and HS-DSCH channels are transmitted with different formats. The HS-SCCH channel uses a spreading factor equal to 128 and is always QPSK modulated. The spreading format of the HS-DSCH is lower and equal to 16. The proposed architecture makes it possible to efficiently receive and demodulate the different channels processed by the receiver.

SUMMARY OF THE INVENTION

According to one aspect, the invention provides apparatus comprising channel estimation means for estimating a channel through which a receiver acquires a signal and Rake receiver means for operating on said signal, wherein the Rake receiver means is arranged to implement a finger for each tap in the channel estimate (the invention extends to a corresponding method). In this way, the invention can reduce the processing burden, in that it is not necessary to assess for which channel estimate taps Rake fingers should be allocated.

According to one aspect, the invention provides apparatus comprising Rake receiver means, pre-filter means, configuring means and evaluation means, wherein the pre-filter means operates on an input to the Rake receiver means, the input represents a signal received through a physical channel, the evaluation means is arranged to evaluate the channel and the configuring means is arranged to re-configure the pre-filter means based on an assessment of the channel after an interval determined with regard to the properties of the channel as determined by the evaluating means (the invention also consists in a corresponding method). In this way, the processing burden may be adapted to the extant physical conditions, thereby allowing unnecessary calculations to be avoided.

According to one aspect, the invention provides apparatus comprising Rake receiver means, pre-filter means and configuring means, wherein the pre-filter means operates on an input to the Rake receiver means, the pre-filter means and the Rake receiver means form the basis of an LMMSE receiver and the configuring means is arranged to calculate filter coefficients for use in the pre-filter means and is arranged to make those coefficients symmetrical (the invention also extends to analogous methods of determining filter coefficients for pre-filter means associated with Rake receiver means). Endowing the pre-filter stage of an LMMSE receiver with symmetrical filter coefficients can reduce the number of computations involved in the operation of the pre-filter stage. Moreover, rendering the coefficients symmetrical may not be significantly detrimental to the operation of the LMMSE receiver. In certain embodiments, a set of filter coefficients is calculated for the pre-filter means, e.g. by reference to CIR measurements, and is then rendered symmetric. This rendering may be achieved by averaging calculated coefficients that appear at symmetric positions, for example.

According to one aspect, the invention provides apparatus comprising pre-filter means and Rake receiver means, which together form the basis of an LMMSE receiver, means for determining filter coefficients for use in the pre-filter means from a signal that is provided for processing through the pre-filter means and the Rake receiver means and means for delaying the signal that is provided to the pre-filter means in order to reduce time misalignment at the pre-filter means between the signal and the coefficients (the invention also extends to a corresponding method). By reducing or—preferably—eliminating this time mis-alignment, better performance may be obtained from the LMMSE receiver of which the pre-filter means and the Rake receiver means are a part. In certain embodiments, the delay implemented by the delay means is variable to account for variation in the duration of the processing required to produce the coefficients (e.g. variation due to variability in filtering used to refine channel estimates from which the coefficients are generated). In certain embodiments, the delay implemented by the delay means is fixed without significant detriment to the operation of the LMMSE receiver of which the pre-filter means and Rake receiver means are a part.

According to one aspect, the invention provides a method of ameliorating channel effects present in a signal received through a channel, the method comprising assessing the interference affecting the signal and processing the signal to ameliorate channel effects, if intra-cell interference dominates inter-cell interference in the signal, in a manner comprising filtering the signal through filter means to ameliorate channel dispersion in the signal and then processing the signal through Rake receiver means or, if intra-cell interference does not dominate inter-cell interference in the signal, in a manner comprising processing the signal through the Rake receiver means without prior amelioration of channel dispersion by the filter means (the invention extends to corresponding apparatus). In this way, the processing burden can be based on the techniques that are likely to have greatest effect.

According to one aspect, the invention provides a method of quantising soft decisions, the method comprising determining a quantisation step and quantising soft decisions using the step, wherein the size of quantisation step is determined with regard to the distribution of the soft decisions (the invention extends to the corresponding apparatus). In this way, the number of bits, or other quanta, used to represent soft decisions representing a signal can be constrained, potentially leading to a reduction in data storage requirements. The step size may or may not be based on the mean of a group of soft decisions. The step size may be based on a variance or standard deviation of a group of soft decisions. Typically, the step size is driven so that it increases as the distribution increases and decreases as the distribution decreases.

According to one aspect, the invention provides apparatus comprising pre-filter means, Rake receiver means, channel estimation means and a physical connection between the channel estimating means on the one hand and the Rake receiver means and the pre-filter means on the other hand, wherein the channel estimating means is arranged to, when a signal without transmit diversity is acquired, estimate the physical channel through which the signal is received and is arranged to, when a signal with transmit diversity is acquired, produce a combined channel estimate for the physical channels through which the signal is received and the apparatus is arranged such that said connection is used for providing both types of channel estimate to the Rake receiver means and to the pre-filter means. In this way, a saving is achieved in that the connection is re-used. In certain embodiments, a further transmit diversity mode is present and additional physical connections are provided between the channel estimating means and the Rake receiver means to convey channel estimates for the physical channels involved in the additional transmit diversity mode.

According to another aspect, the invention provides apparatus for processing a communications signal that has been acquired through a physical channel, the apparatus comprising a plurality of Rake receiver modules each arranged to process the signal under the guidance of a different channel estimate (the invention also consists in a corresponding method). Typically, the different channel estimates relate to different logical channels having different transmit diversity settings (one of which may be "no transmit diversity").

Although the present invention has been described previously in terms of method and apparatus, the invention also extends to software for execution through suitable data processing hardware to implement the signal processing techniques of the invention.

By way of example only, certain embodiments of the invention will now be described with reference to the accompanying drawings, in which:

DETAILED DESCRIPTION

Figure 1:
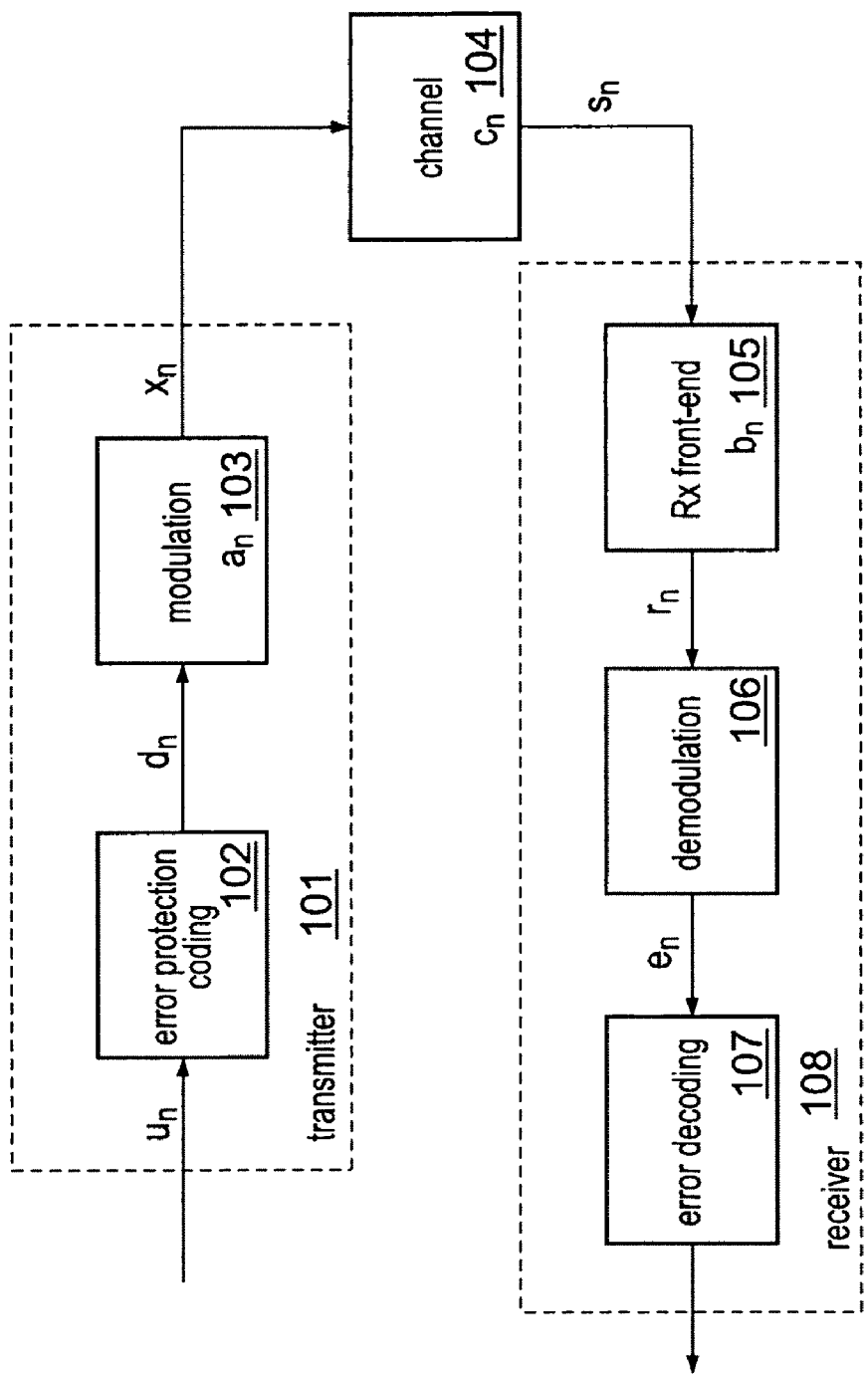
FIG. 1 presents a typical digital communication system where the pre-filter Rake architecture is used.
Figure 2:
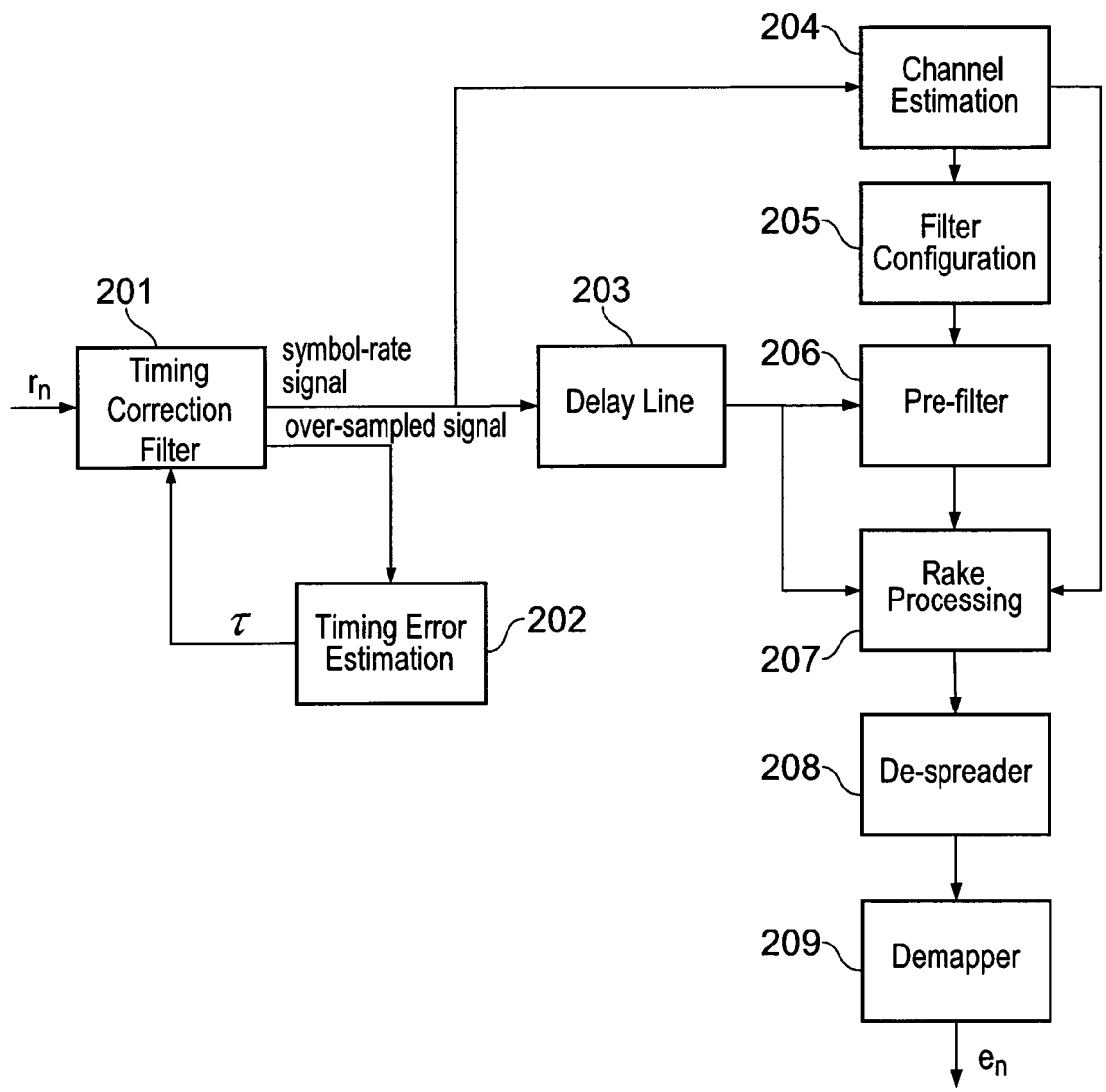
FIG. 2 presents an embodiment of an equalisation receiver.
Figure 3:
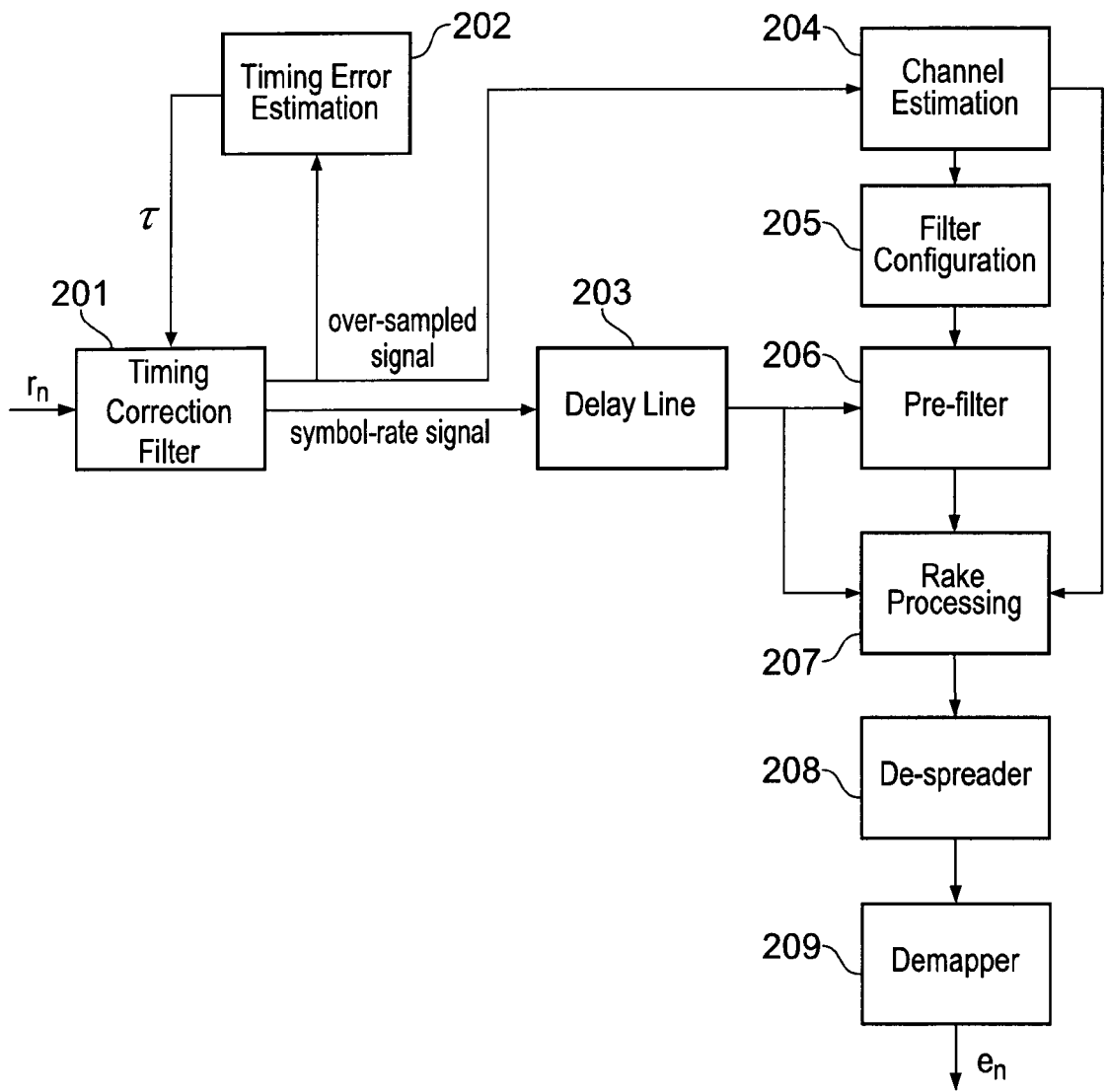
FIG. 3 presents a second embodiment of an equalisation receiver.

FIG. 2 and FIG. 3 present two possible embodiments of an equalisation receiver, which will shortly be described in detail.

The rate at which a receiver operates has a significant impact on both complexity and power consumption. Typically, the number of operations to be performed by the receiver will increase linearly with the sampling rate. Similarly, using a larger sampling rate calls for larger memory buffers. Hence, in order to keep the implementation complexity as low as possible, it is desirable for the receiver to operate with as low a sampling rate as possible. However, it is well known that receivers operating at a rate higher than symbol rate, also referred to as over-sampled architectures, are less sensitive to timing errors than symbol-rate receivers (*Digital Communications*, John G. Proakis, $2^{nd}$ edition, McGraw-Hill International).

Figure 4:
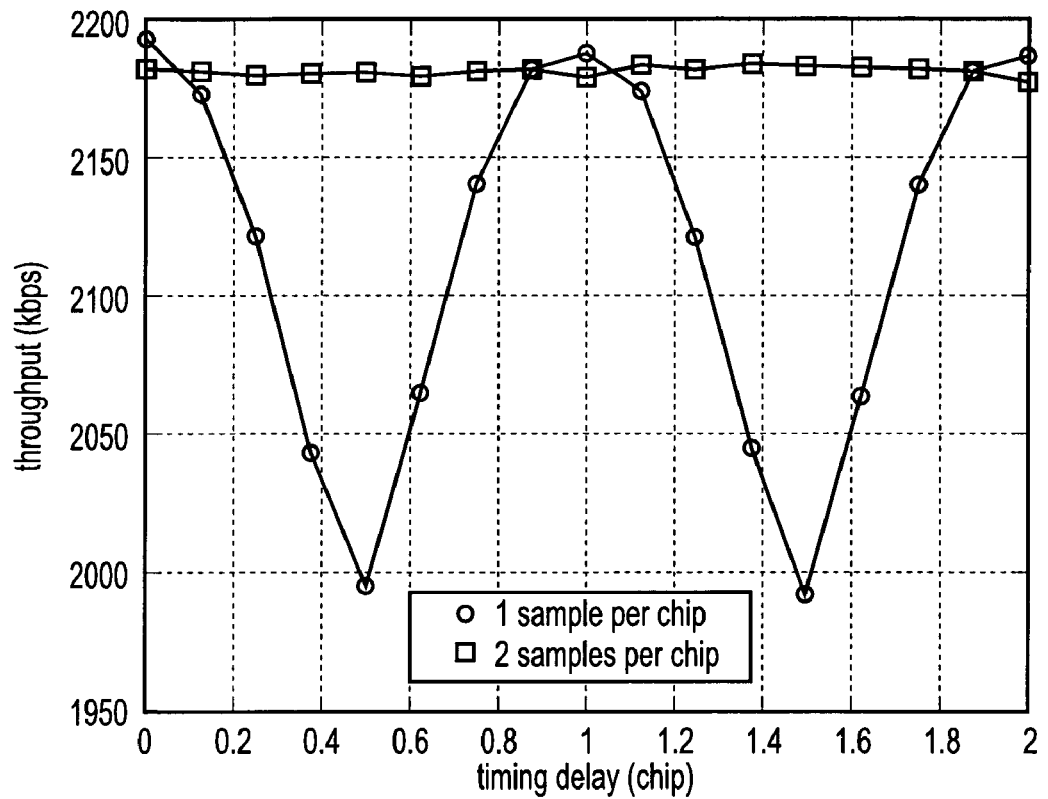
FIG. 4 presents link-level performance results for different over-sampling ratios.

FIG. 4 presents the throughput performance of the pre-filter Rake receiver in fading propagation conditions for both cases of a symbol-rate implementation (one sample per chip) and of an over-sampled implementation (2 samples per chip). The throughput performance is presented versus the timing delay seen by the receiver. It can be seen that in the case of the symbol-rate receiver, the performance significantly varies with the timing used at the receiver. The difference in throughput between the best sampling point and the worst sampling point is approximately equal to 10%. This has to be contrasted against the performance of the over-sampled receiver where the throughput is essentially flat against the timing delay. Hence, using an over-sampled implementation of the receiver reduces/eliminates the need for accurate selection of the sampling point. It is important to note that the best throughput achieved by the symbol-rate receiver is in fact not worse than the best throughput achieved by the over-sampled receiver. Hence if the ideal sampling phase can be selected, it is possible for the receiver to operate on the symbol-rate signal without any performance penalty.

Based on this observation, the first processing stage in the proposed architecture of FIG. 2 applies a timing correction to the received signal. The timing correction filter 201 processes the received signal which is over-sampled and generates two output signals. It should be noted that it is typical for the over-sampling factor in the input signal to be equal to two. The timing correction unit 201 applies a delay to the received signal and outputs two different versions of this delayed signal. The first output signal is generated with a sampling rate equal to that of the input signal. This first output signal is also decimated, using a fixed phase, to symbol rate in order to generate the second output signal. Hence, the timing correction unit produces two output signals having different sampling rates.

The timing correction filter unit 201 can be implemented using Fractional Delay Filters (FDF) combined with a decimation stage to generate the symbol-rate output. The application of the proposed receiver architecture is not limited to any specific implementation of the FDF section. Different possible implementations can for example by found in *Principles of Fractional Delay Filters*, V. Valikimaki, T. I. Laasko, *IEEE International Conference on Acoustics Speech and Signal Processing*, June 2000.

The timing correction applied by unit 201 is controlled by the estimated timing error t derived in the timing error estimation unit 202. The timing error estimation unit 202 derives an estimate of the timing error in the received signal from the over-sampled signal generated output by 201. Different implementations of the timing error estimation unit are possible.

In the embodiment presented in FIG. 2, the over-sampled signal output by the timing correction unit 201 is only used by the timing error estimation unit 202. Any further processing in the receiver is performed on the symbol rate signal. Hence, only the receiver front-end processing required to derive the optimum signal timing is performed on the over-sampled signal. By so doing, the complexity of the receiver is greatly reduced. For example, the memory requirements associated with the delay line 203 are much lower than those of prior-art solutions where the complete processing chain is operating on signals with a rate equal to that of the input signal.

In the embodiment presented in FIG. 3, the over-sampled signal at the output of the timing correction unit 201 is used both for timing error estimation 202 and for channel estimation 204. This embodiment is therefore more complex than that described in FIG. 3 but is still less complex than prior-art solutions. It can be seen, for example, that the memory requirements for the delay line 203 are the same for both embodiments.

Following the timing adjustment made in 201, the receiver estimates the characteristics of the propagation channel in unit 204. Channel estimation can either be performed on the symbol-rate signal (FIG. 2) or on the over-sampled signal (FIG. 3). In both cases, the channel estimates produced by the channel estimation unit 204 correspond to the propagation channel sampled at the symbol rate. Since the processing units using the channel estimates (205 and 207) operate on the symbol-rate version of the signal, there is no benefit in generating an over-sampled representation of the propagation environment. The channel estimation unit 204 will usually use the training sequence and/or pilot signal that is typically embedded in the transmitted signal. In the HSDPA system for example, the Common Pilot Channel (CPICH) can be used to estimate the propagation environment. Different techniques can be used to generate the channel estimates from this pilot signal. Typically, the channel impulse response is estimated by correlating the received samples with the known pilot channel symbols. A number of techniques can then be used to refine these initial channel estimates. It is possible, for example, to filter the different channel taps in order to reduce the power of the estimation noise. Such techniques are described in "*Adaptive Channel Estimation in DS-CDMA Systems*", J. W. Choi and Y. H. Lee, *ECTI Transactions on Electrical Engineering, Electronics and Communications*, vol. 2, no. 1, February 2004.

The channel estimation unit 204 also returns an estimate of the noise power in the received signal. It should be noted that this estimate should only include the power of the noise corresponding to signals that cannot be equalised by the receiver. This can be achieved by estimating the combined power of the thermal noise and the inter-cell interference. Techniques making it possible to calculate the power of both intra-cell and inter-cell interference are described in "*Improving Channel Decoder Performance on the CDMA Forward Link*", *IEEE Transactions on Wireless Communications*, vol. 4, no. 3, May 2005.

In cellular communication systems, it is possible to use Transmit-Diversity (TxD) in order to improve the link level performance. When such a scheme is used, the transmitter sends signals from two different antennas. These two signals then go through different propagation channels before being received and demodulated. The receiver then needs to combine these two different signals in order to recover the transmitted information. In the HSDPA system, two different TxD schemes are implemented (3*GPP TS* 25.211—*Physical channels and mapping of transport channels onto physical channels (FDD)*).

Space Time Transmit Diversity (STTD) is an open loop scheme where the transmission format is selected without any feedback information from the receiver. The second diversity scheme operates in a closed-loop manner and is referred to as CLTD.

When CLTD is used, a phasor is applied to the signal transmitted from the second antenna. The phasor to be applied at the transmitter is selected based on feedback from the receiver. The phase correction to be applied to the estimates of the second propagation channel before combination may come from a number of different sources. The phase difference between the signals transmitted between the two antennas may be known a-priori. It may also be possible for the channel estimation unit 204 to produce an estimate of this phase difference from the received signal.

It should also be noted that different TxD schemes can be used simultaneously. For example, in the HSDPA system it is possible for the HS-SCCH channel to be transmitted using STTD while the HS-DSCH uses CLTD. The receiver needs to simultaneously process and demodulate these two logical channels using different diversity schemes.

In order to efficiently support the reception of multiple channels with different diversity formats, the channel estimation unit is designed to output three sets of channel estimates. As indicated before, all three sets of channel estimates correspond to the propagation channel sampled at the symbol rate.

Figure 6:
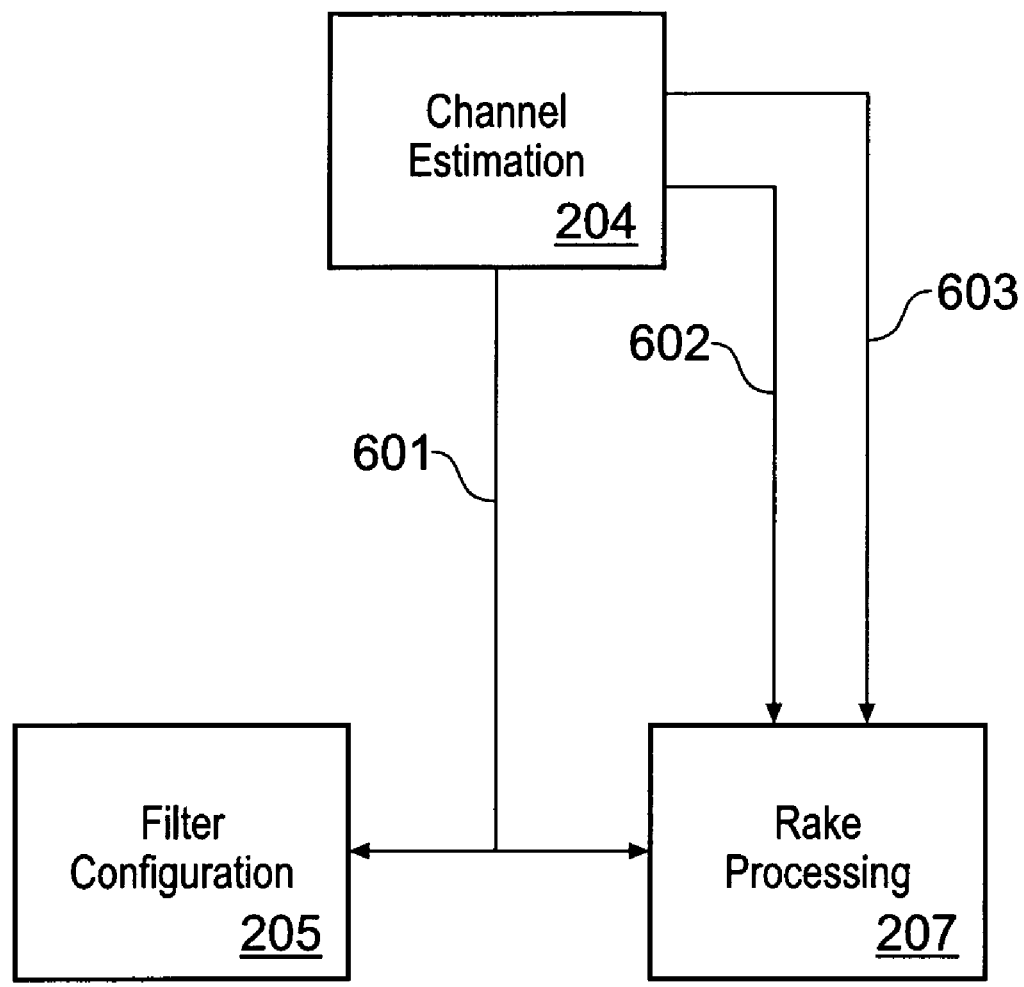
FIG. 6 shows physical connections between elements shown in FIGS. 2 and 3.

The first set of channel estimates is provided over physical connection 601 (FIG. 6) and is input to both the filter configuration unit 205 and to the first Rake processing unit 207. In the absence of TxD, this set of channel estimates correspond to the single propagation channel. When CLTD is used on the HS-DSCH, this output corresponds to the combined channel from both transmit antennas. This combined channel is derived by adding the estimates of the first-antenna channel with those of the second antenna after the CLTD phasor has been applied. When STTD is used on both the HS-DSCH and HS-SCCH channels, this output of the channel estimation unit 204 is disabled.

The second and third sets of channel estimates, which are provided over physical connections 602 and 603 respectively, are generated when STTD is used either for the HS-SCCH channel or the HS-DSCH channel. They correspond to the propagation links between each of the two transmit antennas and the receiver. These channel estimates are then input to the Rake processing unit. It should be noted that these channel estimates are scaled by the inverse of the combined power of the two propagation channels. This scaling is implemented in order to simplify the operation of the demapper 209.

In case of single link transmission, i.e. not TxD, or when CLTD is used, the first set of channel estimates are passed to the filter configuration unit 205. As indicated before, the channel estimation unit 204 also provides an estimate of the noise power in order to derive the filter configuration. The filter configuration unit 205 takes the information provided by the channel estimation unit 204 and derives the coefficients of the filter 206.

Different implementations of the filter configuration unit 205 can be selected and their description is beyond the scope of this document. The reader will be referred to *Chip-Level Channel Equalization in WCDMA Downlink*, K. Hooli, M. Juntti, M. J. Heikkila, P. Komulainen, M. Latva-aho, J. Lilleberg, *EURASIP Journal on Applied Signal Processing*, August 2002 for a review of different possible implementations. It should however be noted that it is typical for the filter computation unit 205 to implement some sort of matrix inversion processing. Hence, the complexity associated with the derivation of the coefficients for the filter 206 is usually high.

The rate at which channel estimates are generated depends on the transmission format of the pilot channel from which these estimates are derived. In the HSDPA system, it is typical for the channel estimates to be produced every 512 chips, equivalent to one fifth of a slot. The filter configuration unit 205 usually operates at the same rate as the channel estimation unit 204. In order to reduce the computational complexity of the receiver, it is possible for the filter configuration unit 205 to operate at a lower rate. It is proposed to dynamically select the rate at which the filter configuration unit 205 operates. The rate adaptation can be performed based on the characteristics of the propagation environment. In slowly changing conditions, it is not required to generate a new filter configuration very frequently. If the channel varies slowly, it would, for example, be possible to generate a new filter configuration only once per slot. In fast moving conditions, the filter configuration unit 205 could operate at the maximum rate, set by that of the channel estimation process. By matching the operation rate of the filter configuration unit 205 to the channel characteristics, it is possible to reduce the computational complexity without any severe link-level performance degradation. A number of different metrics can be derived during the channel estimation process in order to estimate the rate of change in the channel environment and select the operation rate of the filter configuration unit 205. For example, it is possible to estimate the Doppler frequency associated with the channel. It is possible to estimate the Doppler spread of the channel by using techniques described in "*A Doppler estimation for UMTS-FDD based on channel power statistics*", D. Mottier and D. Castelain in *Proc. VTC 1999—Fall*, pp. 3052-3056, 1999.

The coefficients calculated in unit 205 are then used to configure the filter 206 applied to the symbol-rate signal output by the timing correction unit 201. It should be noted that in this document the filter 206 is also referred to as pre-filter. It can be seen from FIG. 2 and FIG. 3 that the signal goes first through a delay line 203 before being filtered. This delay line aims at aligning the signal being filtered with the coefficients of the filter. The generation of the channel estimates and the derivation of the filter configuration will usually have delays associated with them. For example, filtering is usually employed in the channel estimation unit 204. Such filtering operation will introduce a delay in the generation of the channel estimates. This delay is equal to the group delay of the filter being employed. Moreover, the generation of the filter coefficients using the channel estimates is not instantaneous. Hence, the delay introduced by the processing in unit 205 also needs to be taken into account. By delaying the received signal using the delay line 203, it is possible to align the signal filtered in 206 with the correct tap coefficient values. In order to achieve a perfect correction, the delay introduced in the delay line needs to be set equal to the combined delay through the channel estimation and filter configuration units.

It should however be observed that the delay due to the channel estimation may not be fixed. As indicated previously, filtering may be performed in the channel estimation process. Hence, the group delay of these filtering operations needs to be corrected for. The filter used in the channel estimation unit 204 may not be fixed. The frequency response of the channel estimation filter may be adapted to the propagation environment. When the filter configuration is varied according to the rate of change of the transmission channel, the group delay is not fixed anymore. Hence, the delay introduced in the delay line 203 should also be dynamically modified in order to match that of the channel estimation unit 204. Such an adaptive delay scheme may be complex to implement. Moreover, for some configurations of the channel estimation filter, the delay may be very large. When the rate of change of the channel is very low, it is beneficial to use filters with very narrow bandwidth in order to improve the channel quality of the channel estimates. However, when the bandwidth of the filter is small, the group delay will typically be very large. This implies that the delay introduced by 203 will need to be large and hence the associated buffer size will also be high. When the delay through 203 is perfectly matched to the channel estimation and filter configuration processes, the buffer implemented in 203 needs to be large enough in order to cope with the maximum group delay.

However, it has been determined that it is acceptable for the configuration of the delay line 203 to be fixed and set to match the minimum delay through the channel estimation and filter configuration units. Having a fixed delay greatly simplifies the implementation of the delay line 203. Moreover by setting this fixed delay equal to the minimum processing delay, the memory requirements of the delay line are greatly reduced.

This means however that the configuration of the filter 206 does not always match perfectly the signal being processed. This will be true when the channel estimation group delay is larger than its minimum value. However the channel estimation group delay usually increases when the rate of change in the propagation medium becomes lower. Hence, the mismatch between the pre-filter configuration and the signal being processed will not lead to any significant performance degradation.

The values of the coefficients in the pre-filter control the frequency response of the filter and hence the characteristics of the output signal. In one embodiment of the proposed receiver architecture, the coefficients of the pre-filter are forced to be symmetrical. By doing so, the implementation complexity associated with the filtering operation can be significantly reduced. The equation below describes a generic filtering operation:

$$y(n) = \sum_{k=0}^{2 \times L} h(k) \times x(n-k) = \sum_{k=-L}^{L} h(k+L) \times x(n-k-L)$$

x(n) and y(n) are used to denote the input and output signal samples respectively. The 2×L+1 filter coefficients are denoted as h(k).

When the filter coefficients are forced to be symmetrical, the following condition is met for the different filter coefficients:

$$h(L+k)=h(L-k)$$

The filtering computations can then be re-organised in order to make use of this characteristic of the coefficients:

$$y(n) = h(L) \times x(n-L) + \sum_{-L}^{-1} h(k+L) \times x(n-k-L) +$$

$$\sum_{1}^{L} h(k+L) \times x(n-k-L)$$

$$= h(L) \times x(n-L) + \sum_{1}^{L} h(L-k) \times x(n+k-L) +$$

$$\sum_{1}^{L} h(k+L) \times x(n-k-L)$$

$$= h(L) \times x(n-L) + \sum_{1}^{L} h(k+L) \times (x(n+k-L) + x(n-k-L))$$

The number of multiplications required to implement a generic filtering operation is equal to 2×L+1. When the filter coefficients are forced to be symmetrical, the number of multiplications is equal to L+1. Hence, by forcing the coefficients of the pre-filter to be symmetrical, the number of multiplications to be performed has almost been halved. This represents a very significant saving for the implementation of the receiver.

Different techniques can be used to force the filter coefficients to be symmetrical. For example, it is possible to select the values for one half of the filter and force the other filter half to use these values. Alternatively, it would be possible for each coefficient to calculate the average value across the two halves of the filter.

The equalisation receiver implementing an LMMSE solution will usually perform better than the more conventional Rake receiver. It is also more complex to implement as the received signal needs to be processed by the pre-filter 206. The coefficient values also need to be derived in unit 205. The equaliser removes the multi-path introduced by the propagation channel and restores the orthogonality between the different signals transmitted under the scrambling code of the cell of interest. Hence, after de-spreading the intra-cell interference can be removed, or at least the level of intra-cell interference can be significantly reduced. It should however be stressed that the equalisation receiver does not eliminate, nor mitigate, neither inter-cell interference nor thermal noise. Hence, in conditions where inter-cell interference and thermal noise dominate intra-cell interference, the performance gains provided by the equalisation receiver will be very small. In fact under such operating conditions, the performance of the pre-filter Rake and that of the Rake receiver will be very similar. Hence, when the performance of the pre-filter Rake is not expected to be noticeably superior to that of the Rake receiver, the filter configuration unit 205 and the pre-filter 206 are disabled. In this configuration, the implementation of the receiver architecture corresponds to that of a Rake receiver. By doing so, the power consumption of the receiver can be reduced without having any significant impact on the link level performance. The switching between the two receiver configurations can be based in the ratio of intra-cell interference to inter-cell interference and noise. It should be noted that when the receiver is configured to operate as a Rake receiver, the expected delay through the pre-filter 206 could be incorporated into the delay line 203. When this is performed, the delay through the receiver is the same for the two different configurations.

Following filtering in 206, the signal is processed by the Rake processing unit 207. The Rake processing unit also takes inputs from the delay line 203 which are used in case of open-loop transmit diversity. The Rake processing unit is implemented as three separate Finite Impulse Response (FIR) filters with coefficients equal to channel estimates derived in the channel estimation unit 204. The configuration and use of the three filters depends on the transmit diversity mode being used.

When transmit diversity is disabled, only one of the three filters is used. The filter coefficients are set equal to the single set of channel estimates derived in unit 204. The Rake unit 207 then processes the samples output by the pre-filter 206.

When open-loop transmit diversity is used, two of the three filters are enabled. The filter coefficients are set equal to the two different sets of channel estimates corresponding to the transmission links from the two different antennas. When such a transmit diversity mode is used, the Rake unit 207 processes the samples at the output of the delay line 203.

When closed-loop transmit diversity is used, all three filters in 207 are enabled and running. In such a configuration, the HS-DSCH channel is transmitted with CLTD whereas the HS-SCCH channel, which needs to be simultaneously received, is transmitted using STTD encoding. Hence, the Rake unit 207 needs to process the received signal for both transmit diversity modes. The first filter is therefore configured using the channel estimates corresponding to the combination of the two transmission links. Note that as indicated before when describing the operation of the channel estimation unit, the combination of the two sets of channel estimates is performed using the knowledge of, or an estimate of, the phase shift applied at the transmitter. This first Rake filter processes the samples generated by the pre-filter unit 206 and is used to receive the HS-DSCH channel. The second and third filters are used to receive the HS-SCCH channel. They are configured using the channel estimates corresponding to the individual transmission links from the two antennas. They process samples directly from the output of the delay line 203.

It should be noted that the proposed implementation of the Rake processing unit 207 is slightly different to that of prior-art solutions. It is typical for the Rake receiver to allocate fingers to only a sub-set of the estimated channel taps. In the implementation described in this document, the contributions from all the channel taps are taken into consideration. Such an approach presents two main advantages. First, since all the contributions from the propagation channel are used to generate the samples output by the Rake processing unit 207, the accuracy of the demodulation process can be improved. Moreover there is no need for any complicated logic to select the channel taps to which Rake fingers should be allocated. This, however, needs to be balanced against the increase in the effective number of fingers.

Following processing by the Rake unit 207, the I/Q samples are input to the de-spreader 208. The de-spreader simply correlates the input samples against the combined spreading and scrambling code for each of the physical channels to be received. For each physical channel, a single output sample is generated when the correlation has been calculated over the spreading factor of the given channel. Different strategies can be selected for the implementation of the correlation processing. An efficient architecture in the case of multi-code reception can be found in '*Low Power Strategy About Correlator Array for CDMA Baseband Processor*', C. W. Ku, F. Y. Kuo, C. K. Chen and L. G. Chen, *IEEE Workshop on Signal Processing Systems,* 1999. SiPS 99. 1999.

It should also be noted that when open-loop transmit diversity is used, either for the HS-SCCH only or for both HS-SCCH and HS-DSCH channels, the de-spreader 208 also performs the STTD decoding.

Figure 5:
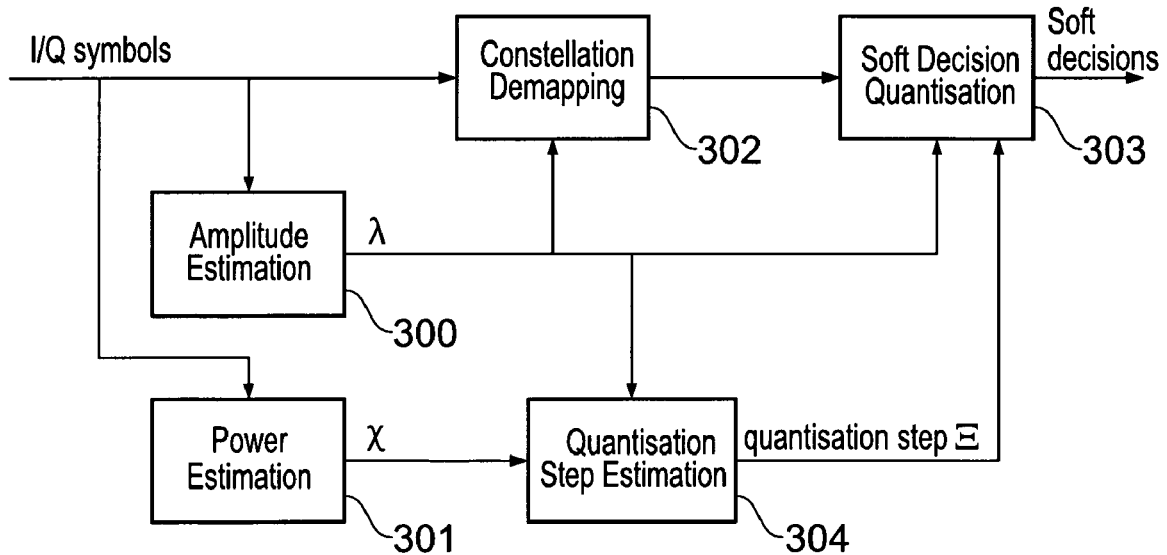
FIG. 5 presents a possible implementation of a demapper unit.

The de-spreading unit 208 generates a series of I/Q samples for each physical channel to be received. These I/Q samples then need to be demodulated in order to generate soft decisions to be passed to the error-correction decoding unit 107. The processing to be performed depends on the modulation format used by the transmitter and is implemented in unit 209. The implementation of the demapper unit 209 is presented in FIG. 5. The different processing steps presented in FIG. 5 need to be repeated for each physical channel being received.

From the received signal, the average amplitude $\lambda$ and the average power $\chi$ are first estimated. Note that this estimation is performed over a block of received samples. In the preferred embodiment of the proposed invention, these estimates are generated using samples corresponding to a fifth of a slot. The estimated average amplitude $\lambda$ is then used to configure the constellation demapping unit 302 which processes the received signal. The implementation of the constellation demapping unit 302 depends on the modulation schemes being used by the transmitter. The soft decisions generated by the constellation demapping unit 302 are then input to the quantiser 303. The aim of the quantiser is to reduce the number of bits used to represent the soft decisions passed to the error-correction decoding unit 107.

Unit 303 uses both the average amplitude $\lambda$ and the quantisation step $\Xi$ to configure the quantisation process of the soft decisions. The quantisation step $\Xi$ is derived in unit 304 from both the average constellation amplitude $\lambda$ and the average constellation power $\chi$:

$$\Xi = f(\lambda, \chi)$$

Where f is designed to increase the quantisation step size when the distribution of amplitude values increases and to decrease the quantisation step size when the distribution of amplitude values decreases.

$$f(\lambda, \chi) = \lambda + \sqrt{\chi - \lambda^2}$$

In order to reduce the implementation complexity of the proposed demapping approach, it is possible to delay the application of the estimates $\lambda$ and $\chi$. For example, these estimates could be derived from samples corresponding to a specific fifth of a slot and then be applied to the samples corresponding to the next fifth of a slot. By so doing, the processing can be performed 'on the fly' without requiring any buffering. When such an approach is used, it is necessary to provide some initial estimates of the $\lambda$ and $\chi$ quantities. It would for example be possible to use values derived from a-priori knowledge. Alternatively, it would be possible to use the last set of estimates to have been generated in order to initialise the next set of values.

In on embodiment of the proposed invention, it is possible to reduce the implementation complexity by sharing some of the processing functions across multiple physical channels. For example, when multiple physical channels are transmitted with the same power, it is possible to produce estimates for the $\lambda$ and $\chi$ quantities using samples from only one of the physical channels. This single set of estimates can then be applied across all the physical channels using the same transmit power configuration. In HSDPA for example, it is possible to estimate the $\lambda$ and $\chi$ quantities only once for all the HS-DSCH channels.

The invention claimed is:

1. A method of ameliorating channel effects present in a signal received through a channel, the method comprising assessing the interference affecting the signal and processing the signal to ameliorate channel effects, if intra-cell interference dominates inter-cell interference in the signal, in a manner comprising filtering the signal through filter means to ameliorate channel dispersion in the signal and then processing the signal through Rake receiver means or, if intra-cell interference does not dominate inter-cell interference in the signal, in a manner comprising processing the signal through the Rake receiver means without prior amelioration of channel dispersion by the filter means.

2. The method according to claim 1, wherein the step of assessing the interference comprises calculating the ratio of, on the one hand, intracell interference and, on the other hand, intercell interference and noise.

3. A method of quantising soft decisions, the method comprising determining a quantisation step and using the step to quantise soft decisions obtained by demodulating symbols constituting a signal, wherein the size of the quantisation step is determined with regard to an amplitude distribution of the symbols, wherein said determining step comprises characterising said distribution using a function of the average amplitude of and of the average power of symbols from the signal.

4. The method according to claim 3, wherein said function has the form $\lambda + \sqrt{\chi - \lambda^2}$, wherein $\lambda$ is the average amplitude and $\chi$ is average constellation power.

* * * * *